United States Patent Office 2,929,711
Patented Mar. 22, 1960

2,929,711

ANIMAL ALIMENTATION: PRODUCT AND PROCESS OF USING THE SAME

Evan L. Robert Stokstad, Pearl River, N.Y., and Edward Clarence de Renzo, Rutherford, N.J., assignors to American Cyanamid Company, New York, N.Y., a corporation of Maine No Drawing. Application January 26, 1956
Serial No. 561,664

4 Claims. (Cl. 99—2)

This invention relates to animal nutrition, more particularly to a new composition of matter comprising animal feed and one or more antibiotic substances which are effective in increasing the rate of growth of young animals and the efficiency with which they utilize their feed. The present invention includes the new compositions as well as the manner of using them.

Recently the use of antibiotics in animal feeds for improving growth characteristics and efficiency of food utilization has become of considerable economic importance. The United States Patent No. 2,619,420, November 25, 1952, to Jukes describes the addition to animal feeds of antibiotics produced by the fermentation of *Streptomyces aureofaciens*. Since that time, a number of antibiotics produced by fermentation have been shown to exert a stimulating effect on the animals' growth when incorporated in the diet. Although chlortetracycline is considered one of the best for this purpose, other antibiotics such as tetracycline, oxytetracycline, penicillin, bacitracin, streptomycin and erythromycin have been found to have a stimulating effect on the growth of young animals. All antibiotics, however, are not useful for this purpose. For example, neomycin, tyrocidin, tyrothricin, acriflavin, actidione, gramicidin, puromycin, subtilin, xanthocylin and others have been found to have no appreciable growth stimulating properties; and in fact, some are actually toxic and tend to decrease the normal rate of growth of the animal.

Various theories have been advanced to explain the beneficial effect of those antibiotics which favorably influence the rate of growth of an animal when taken with the animal's normal diet. Some of these that may be mentioned include the possibility that the antibiotic eliminates from the digestive tract of the animal certain bacteria which compete with desirable vitamin-forming bacteria for food. Another probability is that the antibiotic suppresses the development of disease-producing bacteria or those that produce toxic substances. The antibiotics may in some way enable the desirable bacteria to increase their normal output of vitamins which are absorbed from the intestinal tract and used by the animal. It has also been suggested that the antibiotics favorably influence the absorption from the intestinal tract of elements of nutrition necessary for the animal's growth. Whatever the correct theory may be, it is generally agreed that the favorable action of antibiotics in promoting animal growth is due to its effect on the bacterial flora of the animal's digestive system.

Many factors govern the selection of suitable antibiotics for use in animal feeds, and these cannot all be predicted with certainty. The antibiotic must be relatively non-toxic at levels which the animal might consume. It is not always possible to accurately regulate the intake of a particular food by a single animal; and, therefore, a wide range of safety is necessary.

The antibiotic must also be palatable. Some antibiotic substances are bitter and the animals will not eat adequate amounts of food containing them. The antibiotic must also be stable so that it can be formulated with cheap, edible materials and shipped to the feed mixer and subsequently to the farmer without substantial loss of activity. Some antibiotics which are satisfactory in the laboratory cannot be used in commerce for this reason. The antibiotic must also be effective at reasonable dosage levels, otherwise the cost will be prohibitive.

We have discovered that the antibiotics called viridogrisein and griseoviridin, which are produced by certain unidentified species of Streptomyces and by certain strains of *Streptomyces griseus*, may be effectively used in stimulating the growth of animals when incorporated in their feed in small amounts. These antibiotics are described in articles appearing in Antibiotics Annual, 1954-1955, published by Medical Encyclopedia, Incorporated, New York, commencing at page 777 and continuing through to page 805. The physical, chemical and biological properties of these two antibiotics and a process of producing them is also disclosed in the copending application Serial No. 561,424 of Nestor Bohonos and John Norman Porter, filed January 26, 1956.

Of these two antibiotics, viridogrisein and griseoviridin, the former appears to be more effective in stimulating the growth of animals when the purified materials are incorporated in the animals' feed. Surprisingly, when both antibiotics are included, there appears to be a synergistic effect whereby greater growth is obtained with the same amount of feed in the same period of time than would be the case when using either of the others alone. This remarkable synergistic action is demonstrated by the following.

A basal poultry diet similar to that of diet No. 3, described on page 1055 of Poultry Science, volume 32, 1953, was prepared. This contained essentially the following:

Diet:

| | | |
|---|---|---|
| Casein (crude) | grams | 20.0 |
| Gelatin | do | 8.0 |
| Sucrose | do | 60.5 |
| Bone ash | do | 2.0 |
| Calcium gluconate | do | 5.0 |
| Salt mixture | do | 1.4 |
| Sodium chloride | do | 0.6 |
| Vitamin mixture in glucose | do | 1.0 |
| Corn oil and vitamins A, D, and E | do | 1.0 |
| DL methionine | do | 0.3 |
| Choline chloride | do | 0.2 |
| Vitamin $B_{12}$ | mcg | 5 |

The salt mixture was a mixture of calcium carbonate, magnesium sulfate, manganese sulfate, ferric citrate, copper carbonate and various other mineral elements which are essential to the growth of chicks. Most of these are present in trace amounts, and their use in experimental animal studies has been described in many places. The vitmain mixture likewise contained all of the vitamins known to be essential to the growth of animals.

One-day-old chicks were used in this series of experiments. Forty-eight baby chicks were used as controls and two groups of twelve chicks were used for each of the diets. To these diets was added an antibiotic or a mixture of antibiotics in the amounts shown in the following table per 1000 grams of basal diet. The birds were given feed and water ad libitum. At the end of 19 days they were weighed and their average weights are shown in the following table.

Table I

| Supplement: | Weight in grams at 19 days |
|---|---|
| None | 143 |
| Procaine penicillin, 10 mg. | 145 |
| Viridogrisein— | |
| 3 mg. | 150 |
| 10 mg. | 152 |
| Griseoviridin— | |
| 3 mg. | 142 |
| 10 mg. | 149 |
| Viridogrisein, 1.5 mg. Griseoviridin, 1.5 mg. | 161 |
| Viridogrisein, 5 mg. Griseoviridin, 5 mg. | 179 |

The synergistic effects of mixtures of viridogrisein and griseoviridin are clearly evident from the results shown in the above table.

A similar series of experiments were conducted with duplicate groups of twelve chicks, at the antibiotic levels indicated in Table II. In this series, the weight of the chicks was obtained after twenty-seven days.

Table II

| Supplement: | Weight in grams at 27 days |
|---|---|
| None | 242 |
| Viridogrisein— | |
| 3 mg. | 244 |
| 10 mg. | 305 |
| Griseoviridin— | |
| 3 mg. | 265 |
| 10 mg. | 291 |
| Viridogrisein and griseoviridin, 3 mg. | 301 |
| Procaine penicillin, 10 mg. | 275 |

Again the favorable growth-promoting effects of each of viridogrisein and griseoviridin and the synergistic action of the two when combined is clearly evident.

The foregoing experiments were made with essentially pure viridogrisein and griseoviridin. Another series of experiments was run in which the antibiotics were contained in a material which consisted of a dried aqueous fermentation broth which had been fermented with a species of Streptomyces sp. T–2184 which is known to produce both viridogrisein and griseoviridin, the former being present in predominating proportions. This fermentation liquor had been filtered to remove mycelia and was then frozen and dried to obtain a lyophilized product.

The basal diet in this work was as follows:

Table III

| | Percent |
|---|---|
| Ground corn | 24.7 |
| Soyabean meal | 70.0 |
| Inorganic salts | 4.0 |
| Fortified corn oil | 1.0 |
| Methionine | 0.3 |

To this was added adequate amounts of all of the vitamins known to be essential for the normal growth of chicks. The inorganic salt mixture was as described above. The fortified corn oil contained vitamins A, D, and E in amounts sufficient for normal development of the chick.

To each kilogram of the basal diet was added 2.2 grams of the lyophilized material containing viridogrisein and griseoviridin. The total amount of the antibiotics was of the order of 4 to 5 milligrams per kilogram of the diet. Each group consisted of ten chicks. They were fed the basal diet and supplemented basal diet ad libitum, and at the end of twenty-eight days they were carefully weighed with the following results.

Table IV

| Supp./kg.: | Average weight in grams at 28 days |
|---|---|
| None | 275 |
| 2.2 gm. T–2184 fermentation residue | 298 |
| None | 315 |
| 2.2 gm. T–2184 fermentation residue | 358 |

These results clearly demonstrate the fact that these antibiotics are effective without purification. The fermentation liquor resulting from the production of these antibiotics apparently does not contain other toxic substances which may have been formed during the production of the antibiotics. It is an advantage of the invention, therefore, that the antibiotics can be used in a crude state without the necessity of extensive purification.

The preferred manner of administering viridogrisein or griseoviridin to animals is to mix the antibiotics with their normal food or with a selected portion thereof. The effective or useful range of the antibiotics extends from about 1 milligram of antibiotic per kilogram of food as a minimum to 200 milligrams per kilogram of food as as a maximum. Of course, different animals will eat more food than others and may require more or less of the antibiotic for optimum growth stimulation. Baby chicks, for example, will eat approximately 10 to 15 percent of their body weight per day; and, if consuming a diet in which all of the food material is treated with the antibiotics, the chicks will receive from about 1/10 milligram to 20 milligrams per kilogram of body weight per day. In the case of pigs, there is a lower intake of food. For example, a hundred-pound pig will eat approximately 5 pounds of food a day. The antibiotic content of the food should, therefore, be increased. Generally speaking, the animal should receive from 1/10 milligram to 20 milligrams of antibiotic per kilogram of body weight per day.

When it is desired to administer the antibiotic in only a portion of the animal's daily food, the amount of antibiotic per kilogram of food will be higher than the values indicated above. Similarly when it is desired to prepare a premix for shipment from the antibotic producer to the feed mixer for blending with other components of the animal's diet, the proportion of antibiotic will also be considerably higher than the values suggested above. In view of these considerations, the present invention is intended to cover edible compositions of matter containing from about 1 milligram of antibiotic per kilogram of food up to as much as 10 percent by weight.

Antibiotics are presently used to improve the growth characteristics of poultry and pigs particularly, but favorable results have also been obtained with other animals such as calves and even humans. The term "animal," therefore, as used herein is intended to include all animals. The term "poultry" includes, of course, chickens, turkeys, ducks, pheasant, squab, geese and various other wild and domestic birds which are grown for food.

The term "animal food" or "animal sustenance" is intended to include all edible material including such things as grain, vegetable, animal and fish meals, milk and milk products, grits and other edible substances which may be safely fed to animals of the wide variety included hereinabove.

It will also be understood that there may be instances in which it is desirable to add still other antibiotics such as one of the tetracyclines or a stable salt of penicillin or other antibiotic to the animal feed containing the antibiotics viridogrisein and griseoviridin whereby a superior product is obtained. The present invention, therefore, contemplates the further improvement of the animal feed by the addition of other antibiotics and, of course, still other growth factors, hormones, vitamins, minerals and other substances which are known to favorably influence the growth and general well-being of the animal.

What we claim is:

1. A composition of matter for alimentation of animals comprising animal feed mixed with at least 1 milligram and not more than 100 grams per kilogram of feed of viridogrisein and griseoviridin.

2. A composition of matter of the alimentation of animals comprising animal feed mixed with a dried fermentation residue containing from 1 milligram to 200 milligrams per kilogram of feed of the antibiotics viridogrisein and griseoviridin.

3. The method of preparing material for animal alimentation which comprises the steps of treating an aqueous fermentation liquor containing viridogrisein and griseoviridin to reduce the water content thereof and increase the antibiotic content, adding said product to edible material and blending to obtain mixture in which the antibiotics are uniformly mixed throughout and in amounts ranging from about 1 milligram to 200 milligrams per kilogram of said mixture.

4. The method of preparing material for animal alimentation which comprises the steps of treating an aqueous fermentation liquor containing viridogrisein and griseoviridin to reduce the water content thereof and increase the antibiotic content, adding said product to edible material and blending to obtain a mixture in which the antibiotics are uniformly mixed throughout and thereafter uniformly mixing the said product with animal food the amount of said mixed antibiotics ranging from about 1 milligram to 200 milligrams per kilogram of said food.

References Cited in the file of this patent

UNITED STATES PATENTS

| | | |
|---|---|---|
| 2,563,794 | Rickes et al. | Aug. 7, 1951 |
| 2,619,420 | Jukes | Nov. 25, 1952 |
| 2,723,198 | Pensack | Nov. 8, 1955 |
| 2,738,274 | Le Mense | Mar. 13, 1956 |
| 2,846,310 | Hall et al. | Aug. 5, 1958 |

OTHER REFERENCES

Antibiotics Annual, 1954–55, Medical Encyclopedia, Inc., 1955, pp. 777–805.